US008868931B2

(12) United States Patent
Little et al.

(10) Patent No.: US 8,868,931 B2
(45) Date of Patent: *Oct. 21, 2014

(54) SYSTEM AND METHOD OF SECURITY FUNCTION ACTIVATION FOR A MOBILE ELECTRONIC DEVICE

(75) Inventors: Herbert A. Little, Waterloo (CA); Neil P. Adams, Kitchener (CA); Scott W. Totzke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,339

(22) Filed: Aug. 17, 2012

(65) Prior Publication Data

US 2012/0322414 A1 Dec. 20, 2012

Related U.S. Application Data

(63) Continuation of application No. 12/466,706, filed on May 15, 2009, now Pat. No. 8,256,012, which is a continuation of application No. 10/687,139, filed on Oct. 16, 2003, now Pat. No. 7,536,562.

(60) Provisional application No. 60/418,709, filed on Oct. 17, 2002.

(51) Int. Cl.

| G06F 21/00 | (2013.01) |
| G06F 1/16 | (2006.01) |
| G06F 21/88 | (2013.01) |
| G06F 21/57 | (2013.01) |
| H04W 12/06 | (2009.01) |
| H04M 1/04 | (2006.01) |
| H04W 12/02 | (2009.01) |
| H04W 12/08 | (2009.01) |
| H04M 1/673 | (2006.01) |
| H04M 1/725 | (2006.01) |

(52) U.S. Cl.
CPC .......... *H04W 12/02* (2013.01); *H04M 2250/12* (2013.01); *G06F 2221/2111* (2013.01); *G06F 1/1626* (2013.01); *G06F 21/88* (2013.01); *H04M 1/7253* (2013.01); *H04M 1/72575* (2013.01); *G06F 1/1684* (2013.01); *G06F 21/57* (2013.01); *H04W 12/06* (2013.01); *H04M 1/04* (2013.01); *H04M 1/72527* (2013.01); *G06F 1/1632* (2013.01); *H04W 12/08* (2013.01); *H04M 1/673* (2013.01); *H04M 2250/02* (2013.01); *H04M 1/72577* (2013.01); *G06F 2200/1633* (2013.01)
USPC ............................................ 713/193; 726/27

(58) Field of Classification Search
CPC ......... G06F 21/60; G06F 21/70; G06F 21/31; G06F 21/86; G06F 2221/2147; G06F 21/121
See application file for complete search history.

(56) References Cited

U.S. PATENT DOCUMENTS

| 4,325,142 A | 4/1982 | Nakazawa |
| 4,800,520 A | 1/1989 | Iijima |

(Continued)

FOREIGN PATENT DOCUMENTS

| EP | 1286267 A1 | 2/2003 |
| GB | 2320397 A | 6/1998 |

OTHER PUBLICATIONS

Herbert, Little A. et al.; U.S. Appl. No. 10/687,139, filed Oct. 16, 2003; Title: System and Method of Security Function Activation for a Mobile Electronic Device.

(Continued)

*Primary Examiner* — Izunna Okeke
(74) *Attorney, Agent, or Firm* — Conley Rose, P.C.; J. Robert Brown, Jr.

(57) ABSTRACT

A system and a method are provided for activating one or more security functions of a mobile electronic device. The system and method provide for the activation of one or more security functions when the mobile electronic device is stored in a mobile electronic device holder. Security functions include, for example, closing a data item currently being displayed on the mobile electronic device, erasing decrypted information stored on the mobile electronic device, locking the mobile electronic device, and performing a secure garbage collection operation.

30 Claims, 6 Drawing Sheets

(56) References Cited

U.S. PATENT DOCUMENTS

| | | | |
|---|---|---|---|
| 5,542,105 A * | 7/1996 | Finch et al. | 455/575.1 |
| 5,930,368 A | 7/1999 | Hocker et al. | |
| 5,959,287 A | 9/1999 | Myers et al. | |
| 6,009,338 A | 12/1999 | Iwata et al. | |
| 6,067,076 A | 5/2000 | Hocker et al. | |
| 6,195,570 B1 | 2/2001 | Ishida | |
| 6,236,868 B1 | 5/2001 | Lygas | |
| 6,292,898 B1 | 9/2001 | Sutherland | |
| 6,456,487 B1 * | 9/2002 | Hetterick | 361/679.3 |
| 7,120,254 B2 | 10/2006 | Glick et al. | |
| 7,159,120 B2 * | 1/2007 | Muratov et al. | 713/182 |
| 7,848,703 B1 | 12/2010 | Beard et al. | |
| 2001/0001083 A1 | 5/2001 | Helot | |
| 2002/0039909 A1 | 4/2002 | Rankin | |
| 2003/0035543 A1 | 2/2003 | Gillon et al. | |
| 2003/0065934 A1 | 4/2003 | Angelo et al. | |
| 2008/0040608 A1 | 2/2008 | Li et al. | |

OTHER PUBLICATIONS

Herbert, Little A. et al.; U.S. Appl. No. 12/466,706, filed May 15, 2009; Title: System and Method of Security Function Activation for a Mobile Electronic Device.
Herbert, Little A. et al.; U.S. Appl. No. 13/158,202, filed Jun. 10, 2011; Title: System and Method of Security Function Activation for a Mobile Electronic Device.
Herbert, Little A. et al.; U.S. Appl. No. 13/244,800, filed Sep. 26, 2011; Title: System and Method of Security Function Activation for a Mobile Electronic Device.
Research in Motion Limited; "RIM 950 Handheld User's Guide"; Version 2.0; Apr. 6, 2000; 188 pages.
Research in Motion Limited; "RIM 850 Wireless Handheld User's Guide"; Version 2.0; Aug. 25, 2000; 191 pages.
http://www.fommy.co.in/RIM-OEM-BlackBerry-Holster-P87348.htm; "RIM (OEM) BlackBerry® Holster for BlackBerry 950, BlackBerry 850"; First Viewed on Mar. 9, 2012; 1 page.
http://the-gadgeteer.com/2001/02/26/rim_blackberry_950_review/; "RIM BlackBerry 950 Review"; First Viewed on Mar. 9, 2012; 13 pages.
Office Action dated Mar. 16, 2007; U.S. Appl. No. 10/687,139, filed Oct. 16, 2003; 11 pages.
Final Office Action dated Sep. 26, 2007; U.S. Appl. No. 10/687,139, filed Oct. 16, 2003; 11 pages.
Advisory Action dated Dec. 11, 2007; U.S. Appl. No. 10/687,139, filed Oct. 16, 2003; 3 pages.
Office Action dated Jul. 16, 2008; U.S. Appl. No. 10/687,139, filed Oct. 16, 2003; 10 pages.
Notice of Allowance dated Jan. 8, 2009; U.S. Appl. No. 10/687,139, filed Oct. 16, 2003; 4 pages.
Office Action dated Sep. 30, 2010; U.S. Appl. No. 12/466,706, filed May 15, 2009; 9 pages.
Office Action dated May 19, 2011; U.S. Appl. No. 12/466,706, filed May 15, 2009; 8 pages.
Advisory Action dated Sep. 20, 2011; U.S. Appl. No. 12/466,706, filed May 15, 2009; 3 pages.
Notice of Allowance dated Dec. 13, 2011; U.S. Appl. No. 12/466,706, filed May 15, 2009; 10 pages.
Notice of Allowance dated Apr. 5, 2012; U.S. Appl. No. 12/466,706, filed May 15, 2009; 10 pages.
Office Action dated Apr. 18, 2012; U.S. Appl. No. 13/158,202, filed Jun. 10, 2011; 16 pages.
Office Action dated Dec. 20, 2011; U.S. Appl. No. 13/244,800, filed Sep. 26, 2011; 17 pages.
Final Office Action dated Jul. 5, 2012; U.S. Appl. No. 13/244,800, filed Sep. 26, 2011; 28 pages.
Canadian Office Action dated Aug. 10, 2006; Application No. 2,445,413 filed Oct. 17, 2003; 3 pages.
Canadian Office Action dated Apr. 13, 2007; Application No. 2,445,413 filed Oct. 17, 2003; 3 pages.
Canadian Notice of Allowance dated Feb. 19, 2008; Application No. Application No. 2,445,413 filed Oct. 17, 2003; 4 pages.
European Search Report; EP Application No. 03023675.6; Jul. 11, 2006; 3 pages.
European Notification of Grant dated Nov. 27, 2008; EP Application No. 03023675.6, filed Oct. 17, 2003; 7 pages.
European Extended Search Report; EP Application No. 09164467.4; Aug. 6, 2009; 7 pages.
European Notification of Grant dated Oct. 20, 2010; EP Application No. 09164467.4, filed Oct. 17, 2003; 7 pages.
Notice of Allowance dated Oct. 9, 2012; U.S. Appl. No. 13/158,202, filed Jun. 10, 2011; 17 pages.
Office Action dated May 22, 2013; U.S. Appl. No. 13/244,800, filed Sep. 26, 2011; 23 pages.
Notice of Allowance dated Dec. 26, 2013; U.S. Appl. No. 13/244,800, filed Sep. 26, 2011; 28 pages.

* cited by examiner

US 8,868,931 B2

SYSTEM AND METHOD OF SECURITY FUNCTION ACTIVATION FOR A MOBILE ELECTRONIC DEVICE

CROSS-REFERENCE TO RELATED APPLICATIONS

This application is a continuation of U.S. patent Ser. No. 12/466,706, filed on May 15, 2009, by Herbert A. Little, et al., entitled "System and Method of Security Function Activation For a Mobile Electronic Device," which is a continuation of U.S. Pat. No. 7,536,562, issued May 19, 2009, which claims priority to U.S. Provisional Application No. 60/418,709, filed on Oct. 17, 2002, which are hereby incorporated herein by reference as if reproduced in their entirety.

BACKGROUND

Known mobile electronic devices ("mobile devices") include cellular telephones, personal digital assistants ("PDAs"), wireless data communication devices like two-way pagers, voice/data communicators, etc. Recently, many companies have attempted to provide mobile devices that serve a variety of communication or organizational needs, such as data communication, voice communication or PDA functionality. For example, many cellular telephone manufacturers have begun to integrate PDA functionality into their products, some PDA manufacturers have integrated wireless data modems into their products to provide data communication, and firms that primarily manufacture wireless data communication devices have combined the functionality of a wireless data device, such as a two-way pager, with PDA functions.

As such, a modern mobile device may store many different types of information, including confidential or otherwise sensitive information. Although an owner of such information, an owner of a mobile device or an employer of a mobile device user, for example, generally strives to maintain the information in a secure location and restrict information access to authorized users, remote access to information is often required. However, even when remote access to information through a mobile device is enabled, the information should remain secure.

SUMMARY

A system and method for activating one or more security functions of a mobile device are provided. The system comprises a mobile device holder and a mobile device containing a proximity detector. The proximity detector is configured to detect that the mobile device is stored in the holder. The mobile device is configured to activate one or more security functions when the proximity detector detects that the mobile device is stored in the holder. The method comprises the steps of providing a mobile device holder, detecting whether the mobile device has been stored in the holder, and activating one or more security functions when the mobile device has been stored in the holder.

DETAILED DESCRIPTION

Figure 1:
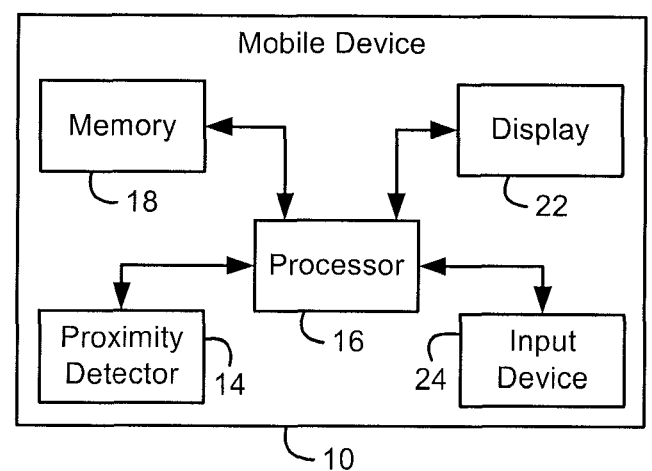
FIG. 1 is a block diagram of a system for activating a security function of a mobile device.
Figure 1:
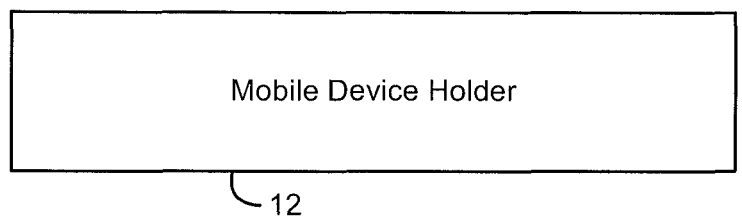

FIG. 1 is a block diagram of a system for activating one or more security functions of a mobile device. The system in FIG. 1 includes a mobile device 10 and a mobile device holder 12, in or upon which the mobile device may be stored, normally when not in use.

The mobile device 10 has a proximity detector 14, a processor 16, a memory 18, a display 22, and an input device 24. The block diagram in FIG. 1 shows only those components of the mobile device 10 directly involved in security function activation. Actual mobile devices in which security function activation systems and methods are implemented may include further, fewer, or different components than those shown in FIG. 1.

The proximity detector 14 is configured to detect when the mobile device 10 is stored in the mobile device holder 12. The nature and operation of the proximity detector 14 depends upon the type of the mobile device holder 12, as described in further detail below. In one embodiment, the mobile device holder 12 includes a magnet, and the proximity detector 14 is a magnet detector.

The processor 16 controls overall operation of the mobile device 10, and executes operating system software and a plurality of software applications. Security functions for the mobile device 10, such as password protection, secure information access, memory erasure, and the like, are also supported by either the operating system software or software applications.

As shown at 18, the mobile device 10 also includes a memory for storing information. The memory 18 stores operating system software, software applications, a plurality of types of information, including private or confidential information, and the like. Information stored in the memory 18 typically includes, but is not limited to, data files, personal information manager (PIM) data, calendar appointments, todo lists, and, where the mobile device is enabled for communications functions, sent and received messages such as email messages. Although shown as a single block 18 in FIG. 1, it should be appreciated that the memory 18 may, and typically does, incorporate different types of memory for different purposes. For example, the memory 18 may include, but is not limited to, volatile and non-volatile memory components, each of which may be of read-write or read-only type.

The display 22 and input device 24 provide interfaces between a user of the mobile device 10 and the mobile device 10. Information is displayed to a user on the display 22 and accepted as user inputs from the input device 24. In a mobile device such as 10, the display 22 may be, but is not limited to, a liquid crystal display ("LCD"). Perhaps the most common types of input device 24 in a mobile device include, but are not limited to, keypads and keyboards, although combined display/input devices are also known.

In operation, the mobile device 10 is preferably configured to provide a plurality of communication and information management functions. Information stored in the memory 18, received at the mobile device 10 via a wireless transceiver, for example, or input to the mobile device 10 using the input device 24 may be displayed on the display 22, edited, stored to the memory 18 if not already stored, or otherwise processed on the mobile device 10. As described briefly above, some information stored in, received at, or input to the mobile device 10 may be confidential or sensitive information to which access should be restricted.

The mobile device holder 12 is configured to receive the mobile device 10, or a portion thereof. The holder 12 may, for example, be a holster in which the mobile device 10 is carried, or a cradle through which the mobile device 10 is connected to a computer system. In general, the holder 12 is a component in or upon which the mobile device 10 is stored when not in use. Thus, references to storing a mobile device in a holder are intended to include operations such as, but not limited to, positioning a mobile device or part of a mobile device into or upon the holder, placing the mobile device in proximity to the holder, or arranging the mobile device and holder in another predetermined relative position.

In computer systems connected in a local area network (LAN), for example, common in modern workplaces, access to confidential information on the computer systems or in data stores on the LAN is controlled through user accounts and passwords. Physical access to computer systems is also normally restricted to employees, such that even when a user leaves a computer system unattended, the computer system and its resources are available only to another employee. Prevention of unauthorized access to confidential information is therefore relatively straightforward in such systems.

When confidential information is stored on or received at a mobile device, however, maintaining access control can be more difficult, especially when an authorized user of the mobile device loses physical control of the mobile device. As long as the mobile device is in the possession of the authorized user, the user has direct control over displaying, editing, transmitting, or other processing of any confidential information. In the event that the mobile device becomes accessible to an unauthorized party, the user can no longer restrict access to information stored on the mobile device or functions or services supported on the mobile device.

Password protection for mobile devices is one known security mechanism. Once a mobile device is "locked", a password or passphrase must be correctly entered before the mobile device is usable. Known mobile devices may be locked either manually by a user or automatically after the mobile device has been idle for a predetermined timeout period. Although the timeout period provides a backup security measure when a user forgets to lock the mobile device, the mobile device is usable until the timeout period expires. If an unauthorized user obtains the mobile device during the timeout period, mobile device information, services, and functions remain accessible.

As described in more detail below, these known security problems are addressed by the technology described herein, where security functions are activated for the mobile device 10 when it is stored in the holder 12. As described above, the holder 12 is configured to receive the mobile device 10 or a part thereof when the mobile device 10 is not being used. When the proximity detector 14 detects that the mobile device 10 has been stored in the holder 12, the processor 16 activates security functions for the mobile device 10. In one embodiment, the proximity detector 14 outputs a detection signal to the processor 16 when the mobile device 10 is stored in the holder 12. Alternatively, the processor 16 may monitor or poll the proximity detector 14 to determine whether the mobile device 10 is stored in the holder 12.

When the mobile device 10 is stored in the holder 12 and detected by the proximity detector 14, the processor 16 activates one or more security functions. The particular security functions activated may be configurable by a manufacturer, owner, or user of the mobile device 10. An owner of the mobile device 10 may be the user, when the mobile device 10 is purchased by the user for personal use, but where the mobile device 10 is provided to the user by an employer, the owner is the employer.

If information is being displayed on the display 22 when the mobile device 10 is stored in the holder 12, then a security function to close the data item and clear the information from the display 22 is preferably activated. Where the displayed information is a decrypted version of encrypted information, such as an encrypted email message, a further security function to remove from the memory 18 any part of the encrypted information stored in decrypted form is preferably activated. In order to display the information again, the encrypted information must first be decrypted, which often requires a user to correctly enter a password or passphrase. Information stored in a controlled-access area of the memory 18 could be similarly secured with a password or passphrase and protected by activating the above security functions when the mobile device 10 is stored in the holder.

Stored information, as well as other resources of the mobile device 10, may be similarly protected where password or passphrase security has been enabled on the mobile device 10. Activation of a security function of locking the mobile device 10 when it is stored in the holder 12 requires correct entry of a password to access any resources of the mobile device 10. Until a password or passphrase, typically chosen by a user, is correctly entered on the mobile device 10, all resources of the mobile device 10, including stored information, mobile device functions, and any services provided on the mobile device 10, are not accessible.

Another potentially valuable security function is recovering memory space that was used to store information that has since been deleted. On systems enabled for Java™, for example, this is generally referred to as "garbage collection." In many known memory systems, deletion of information involves de-referencing of pointers used to access the information, without actually erasing the stored information. These pointers can then be collected and re-used to store new information. Thus, even though a user has "deleted" information, the information may remain in memory until it is overwritten with new information. When the mobile device 10 is enabled for storing, receiving, or otherwise accessing confidential information, secure garbage collection, in which random or predetermined data is written into memory areas corresponding to de-referenced pointers, may be preferred. Such a security function, when activated upon storage of a mobile device 10, ensures that deleted information does not remain in memory when the mobile device 10 is stored in the holder 12. If the mobile device 10 is lost or stolen after it has been stored in the holder 12, for example, then at least previously deleted confidential information cannot be accessed.

Therefore, the mobile device 10, or at least particular information stored on the mobile device 10 or functions or services supported on the mobile device 10, are protected when the mobile device 10 is stored in the holder 12. If an unauthorized party removes the mobile device 10 from the holder 12, as in a so-called "pickpocket" attack, for example, confidential or sensitive information stored on the mobile device 10, and possibly other resources of the mobile device 10, remain secure.

Figure 2:
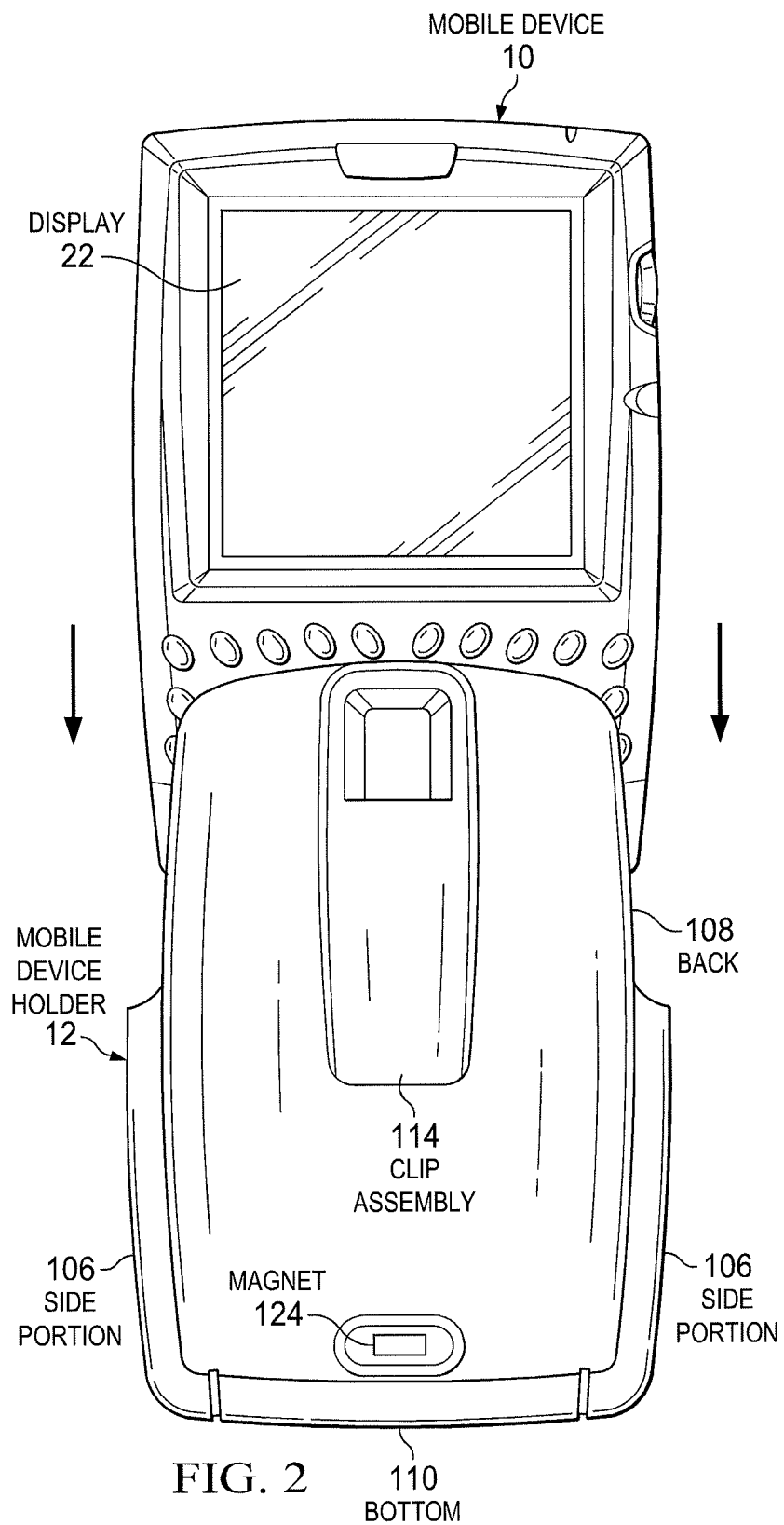
FIG. 2 is a rear view of a mobile device holder shown with a mobile device being inserted into the holder.

FIG. 2 shows a rear view of a mobile device holder for a mobile device. The holder 12 comprises a back 108, sides 106, and bottom 110 that extend toward the front to form a repository for the mobile device 10. Specifically, the curved side portions 106 and the bottom 110 are formed to conform to the shape of the mobile device 10.

The holder 12 also has a clip assembly 114 that includes a clip that is spring-loaded and attached to the back 108. One possible manner of attachment and construction of the clip assembly 114 to the back 108 is described in U.S. Pat. No. 6,073,318, entitled "Retaining Clip Assembly," issued on Jun. 13, 2000, and assigned to the assignee of the present application. The complete disclosure of this patent, including specification and drawings, is hereby incorporated into this application by reference.

The holder 12 has a magnet 124 located on the back 108 above the bottom 110. The magnet 124 is preferably positioned at a location equidistant from the sides 106. In the embodiment shown in FIG. 2, the proximity detector 14 (FIG. 1) in the device 10 is a magnet detection system. The location of the magnet 124 is therefore preferably adjacent the location of the magnet detection system in the mobile device 10 when the mobile device 10 is placed in the holder 12.

FIG. 2 also shows how the mobile device 10 is inserted into the holder 12. The mobile device 10 slides into the opening of the holder 12 from the top of the holder 12, as indicated by the broken arrows at the sides of the mobile device 10. The mobile device 10 is positioned such that the display 22 is facing the inside of the back 108 of the holder 12 and the bottom of the mobile device 10 is pointing downwards. The bottom of the mobile device 10 engages the bottom 110 of the holder 12 when it is properly stored. When the mobile device 10 is stored in the holder 12, the magnet 124 lies adjacent to the proximity detector, in this case a magnet detection system, of the mobile device 10.

Figure 3:
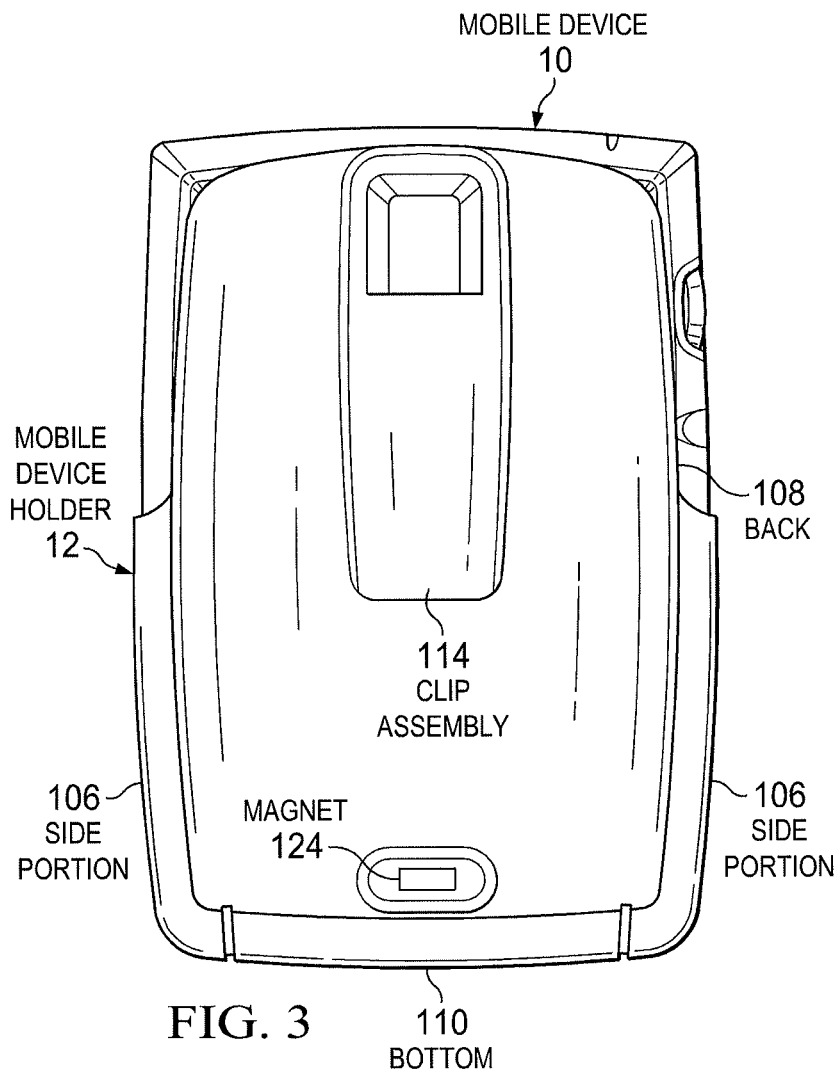
FIG. 3 is a rear view of the holder in FIG. 2 with the mobile device fully inserted into the holder.

FIG. 3 is a rear view of the holder in FIG. 2 with the mobile device stored in the holder. The back 108 of the holder 12 preferably obscures the display 22 (FIG. 2) of the mobile device 10. Because the display 22 is obscured, the mobile device 10 may shut off the display 22 when it is stored in the holder 12, to thereby conserve battery power. When in the holder 12, the magnet detection system in the mobile device 10 preferably lies adjacent to the magnet 124 so that the magnet detection system detects that the mobile device 10 has been stored in the holder 12. Responsive to a detection that the mobile device 10 has been stored in the holder 12, security functions are activated for the mobile device 10.

Figure 4:
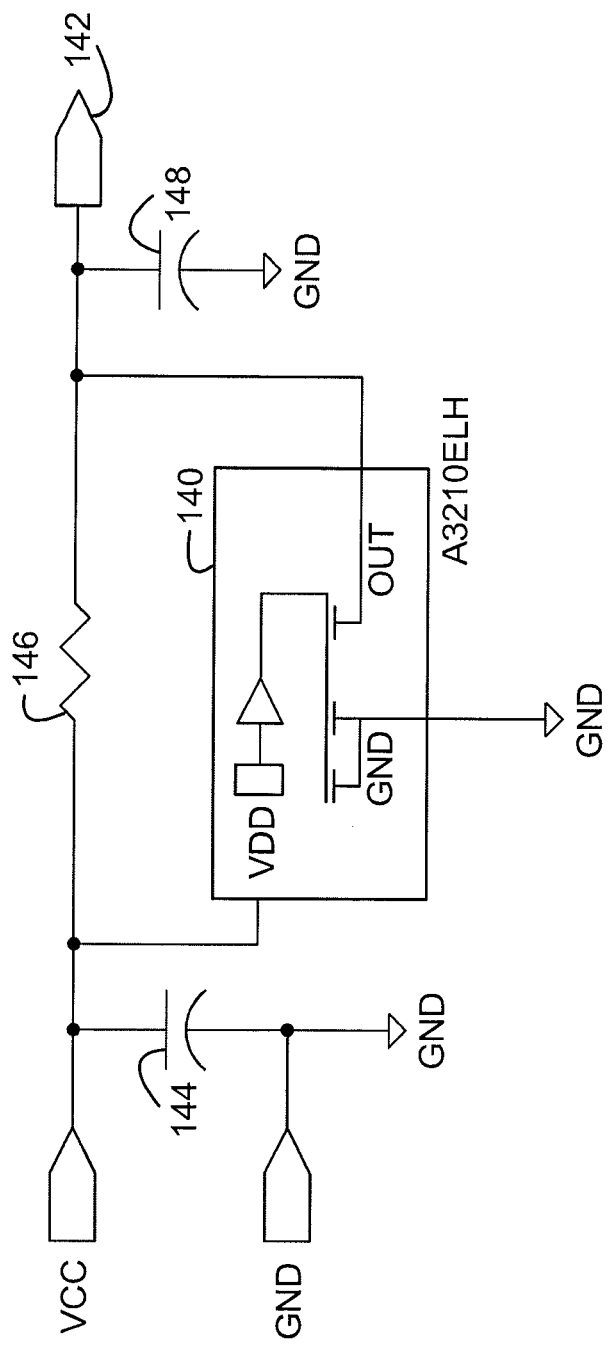
FIG. 4 is a circuit diagram of a magnet detection system.

FIG. 4 is a circuit diagram of a magnet detection system. The magnet detection system preferably utilizes a Hall effect magnetic proximity sensor to detect the presence of the magnet 124 mounted in the holder 12 (FIG. 3). Detection of the magnet 124 activates security functions for the mobile device, as described herein.

This type of magnetic proximity sensor makes use of the Hall effect phenomenon, in which a material with a current flowing through it and a magnetic field passing through it in a direction perpendicular to the direction of the current flow develops a potential difference, in a direction that is orthogonal to, and having a magnitude that is proportional to, both the current and the magnetic field.

In FIG. 4, a Hall effect sensor is shown at 140. Although the magnet itself is not shown in FIG. 4, its presence in close proximity to the sensor 140 causes the sensor to change its output signal from a high logic level signal to a low logic level signal. This output signal appears on the output signal line 142, which is read at a digital input port of the mobile device's processor 16 (FIG. 1). As those skilled in the art will appreciate, the VDD, GND and OUT labels inside the sensor 140 refer to pin designations for the sensor 140, whereas VCC and GND labels outside the sensor refer to the power supply of the magnet detection system. Capacitor 144 decouples from this power supply current glitches that occur during switching of the sensor output signal. Resistor 146 increases the signal level on the output signal line 142 to a high logic level when no magnet is detected, as this signal is not actually driven to a high level by the sensor 140. Capacitor 148 decouples high-frequency interference that may appear on the output signal line 142, where the mobile device incorporating the magnet detection system is enabled for wireless communications and is transmitting, from the sensor 140. The sensor 140 may be adversely affected by such high-frequency disturbances.

Figure 5:
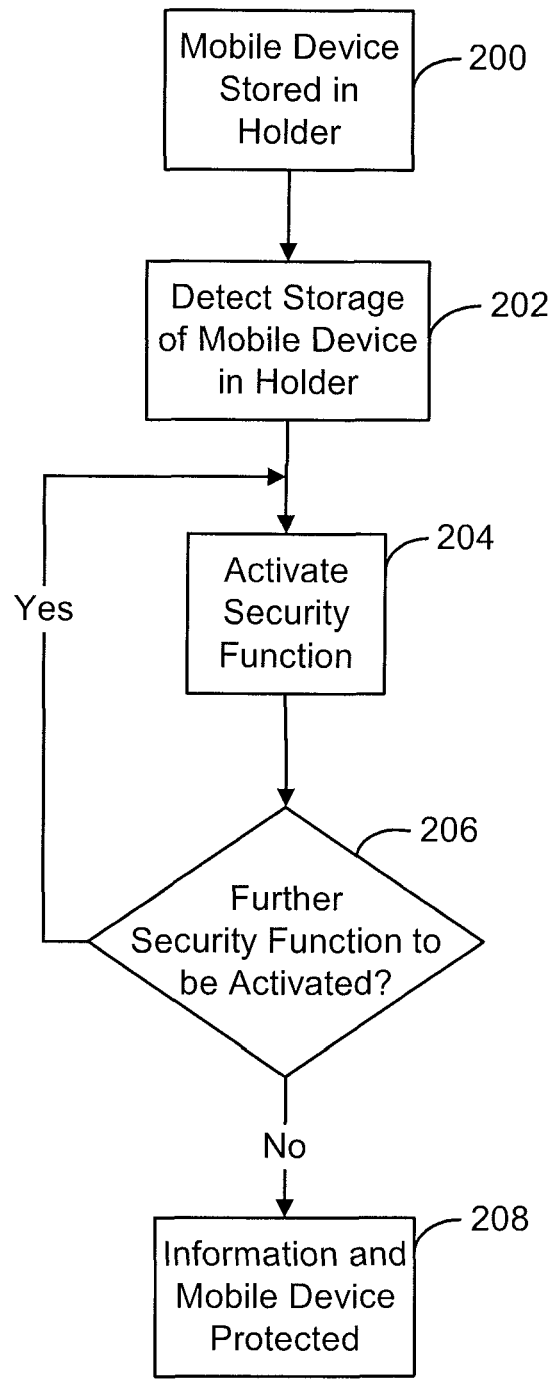
FIG. 5 is a flow diagram illustrating a method of activating one or more security functions for a mobile device.

FIG. 5 is a flow diagram illustrating a method of activating a security function for a mobile device. When a user has completed operations using the mobile device, such as reading a received email message or composing and sending an outgoing email message, the mobile device may be stored in a holder at step 200, as described above. A proximity detector, such as the magnet detection system described above, for example, detects that the mobile device has been stored in the holder at step 202. In accordance with an aspect of the invention, a security function for the mobile device is activated at step 204 when the mobile device has been stored in the holder.

Where more than one security function is to be activated when the mobile device is stored in the holder, as determined at step 206, each security function is activated at step 204. As described above, a mobile device may be configured by a mobile device owner, user, or manufacturer to specify the particular security functions to be activated. Security functions activated at step 204 may include any or all of the security functions described above, as well as other security functions apparent to those skilled in the art and those developed in the future. When configured security functions have been activated, information on the mobile device, and possibly mobile device functions and services, is protected, as indicated at step 208.

Figure 6:
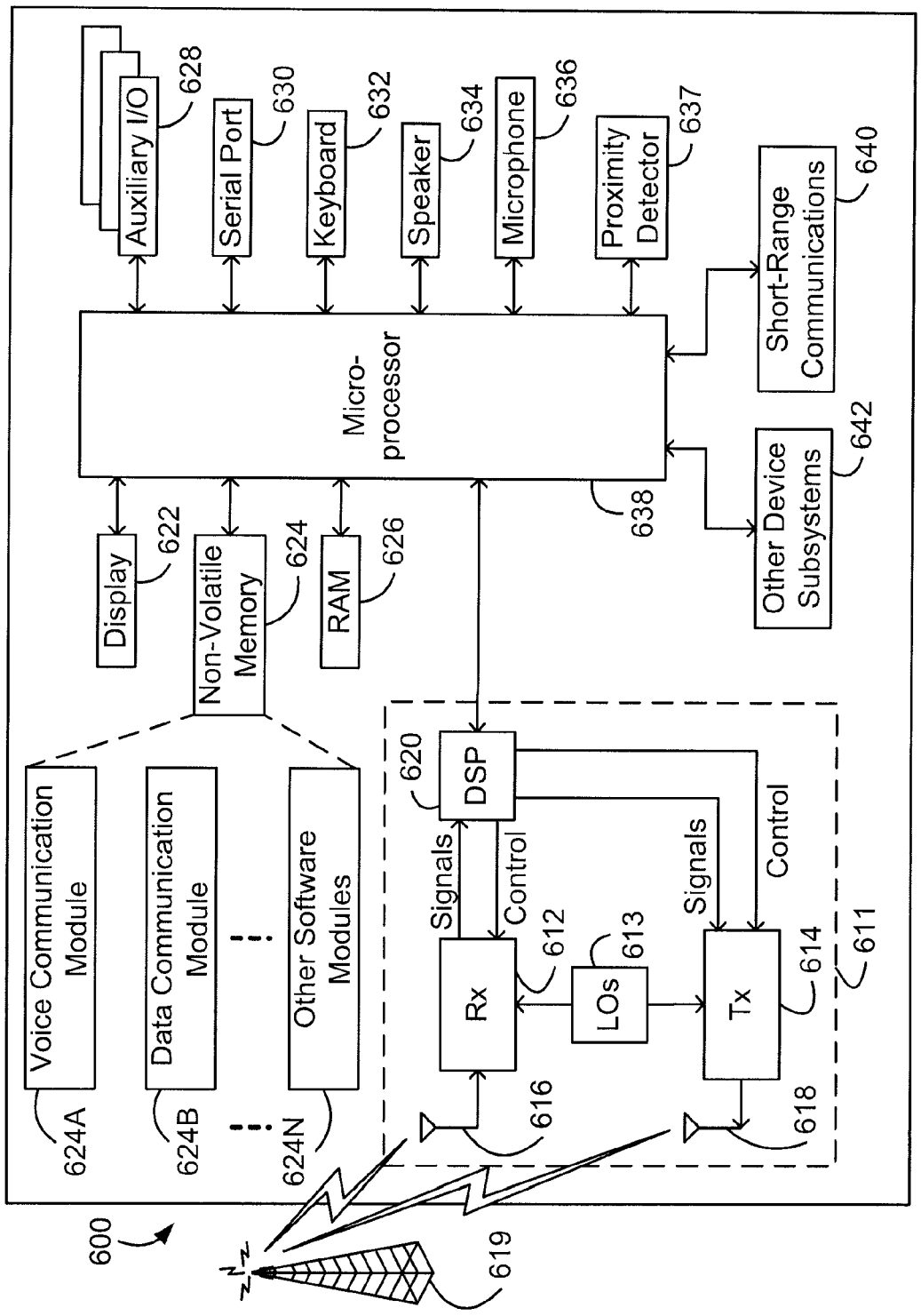
FIG. 6 is a block diagram of a mobile device implementing a security function activation system and method.

FIG. 6 is a block diagram of a mobile device implementing a security function activation system and method. The mobile device 600 is preferably a two-way communication device having at least voice and data communication capabilities. The mobile device 600 preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

The mobile device 600 includes a transceiver 611, a microprocessor 638, a display 622, non-volatile memory 624, RAM 626, auxiliary input/output (I/O) devices 628, a serial port 630, a keyboard 632, a speaker 634, a microphone 636, a proximity detector 637, a short-range wireless communications sub-system 640, and other device sub-systems 642. The transceiver 611 includes transmit and receive antennas 616, 618, a receiver (Rx) 612, a transmitter (Tx) 614, one or more local oscillators (LOs) 613, and a digital signal processor (DSP) 620. Within the non-volatile memory 624, the mobile device 600 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

As described above, the mobile device 600 is preferably a two-way communication device having voice and data communication capabilities. Thus, for example, the mobile device 600 may communicate over a voice network, such as any of the analog or digital cellular networks, and may also communicate over a data network. The voice and data networks are depicted in FIG. 6 by the communication tower 619. These voice and data networks may be separate communication networks using separate infrastructure, such as base stations, network controllers, etc., or they may be integrated into a single wireless network.

The communication subsystem 611 is used to communicate with the network 619. The DSP 620 is used to send and receive communication signals to and from the transmitter 614 and receiver 612, and may also exchange control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 can be used to generate a plurality of frequencies corresponding to the network 619. Although two antennas 616, 618 are depicted in FIG. 6, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., will be dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also designed to operated with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the dual-mode mobile device 600 may also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 6 for both voice and data communications, the mobile device 600 may include two distinct transceivers, a first transceiver for transmitting and receiving voice signals, and a second transceiver for transmitting and receiving data signals.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600. Many types of microprocessors or microcontrollers could be used for this part, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as, for example, e-mail messages, files, organizer information, short text messages, etc., between the mobile device 600 and a plurality of other data devices via the network 619.

The microprocessor 638 also interacts with other device subsystems, such as the display 622, non-volatile memory 624, random access memory (RAM) 626, auxiliary input/output (I/O) subsystems 628, serial port 630, keyboard 632, speaker 634, microphone 636, proximity detector 637, short-range communications subsystem 640 and any other device subsystems generally designated as 642.

Security function activation as described herein is enabled by the proximity detector 637, which detects when the mobile device 600 has been stored in a holder. The microprocessor 638 invokes security functions, for example, by executing a software module or application, or a utility that is provided by a security software module, application or operating system software. As described above, information stored in memory of the mobile device 600, including the non-volatile memory 624 and the RAM 626, as well as other resources of the mobile device 600, are protected after the mobile device 600 has been stored in a holder.

Some of the subsystems shown in FIG. 6 perform communication-related functions, whereas other subsystems may provide "resident" or on-device functions. Notably, some subsystems, such as keyboard 632 and display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. In addition to the operating system and communication modules 624A-N, the non-volatile memory 624 may also include a file system for storing data. A storage area is also preferably provided in the non-volatile memory 624 to store public keys, a private key, and other information required for secure messaging. The operating system, specific device applications or modules, or parts thereof, may be temporarily loaded into a volatile store, such as RAM 626 for faster operation. Moreover, received communication signals may also be temporarily stored to RAM 626 before permanently writing them to a file system located in the non-volatile store 624. As those skilled in the art will appreciate, the non-volatile store 624 may be implemented as a Flash memory component or a battery backed-up RAM, for example.

An exemplary application module 624N that may be loaded onto the mobile device 600 is a PIM application providing PDA functionality, such as, for example, calendar events, appointments, and task items. This module 624N may also interact with the voice communication module 624A, for example, for managing phone calls, voice mails, etc., and may also interact with the data communication module 624B for managing, for example, e-mail communications and other data transmissions. Alternatively, all of the functionality of the voice communication module 624A and the data communication module 624B may be integrated into the PIM module.

The non-volatile memory 624 preferably provides a file system to facilitate storage of PIM data items on the mobile device 600. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to enable a user to establish messaging settings through an external device or software application, to download other application modules 624N for installation, and to load Certs, keys and other information onto a device. This wired download path may be used to load an encryption key onto the mobile device 600, which is a more secure method than exchanging encryption information via the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, is processed by the transceiver 611 and provided to the microprocessor 638, which preferably further processes the received signal for output to the display 622, or, alternatively, to an auxiliary I/O device 628. A user of mobile device 600 may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include, but are not limited to, a thumbwheel input device, a touchpad, a variety of switches, and a rocker input switch. The composed data items input by the user may then be transmitted over the communication network 619 via the transceiver 611.

When the mobile device 600 is operating in a voice communication mode, the overall operation of the mobile device 600 is substantially similar to the data mode, except that received signals are preferably output to the speaker 634 and voice signals for transmission are generated by a microphone 636. Alternative voice or audio I/O subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

Security functions may be activated as described herein whenever the mobile device 600 is stored in a holder, whether the mobile device 600 has most recently been used for voice or data communications.

A short-range communications subsystem 640 is also included in the mobile device 600. For example, the subsystem 640 may include an infrared device and associated circuits and components, or a short-range wireless communication module such as a Bluetooth™ communication module or an 802.11 module to provide for communication with similarly-enabled systems and devices. Those skilled in the art will appreciate that "Bluetooth" and "802.11" refer to sets of specifications, available from the Institute of Electrical and Electronics Engineers (IEEE), relating to wireless personal area networks and wireless LANs.

Proximity detectors other than the magnet detection system described above may be implemented to detect when a mobile device has been stored in a holder. For example, when the mobile device is configured for connection to a computer system through the serial port 630, for example, the microprocessor 638 or software executing thereon may detect that the mobile device has been stored in the holder. Storage of a mobile device might also or instead be detected when the mobile device is connected to or communicates with another device or system through such interface components as a Universal Serial Bus (USB) port, an infrared port, a Bluetooth module, or an 802.11 module.

It should also be appreciated that more than one type of proximity detector may be implemented in a mobile device to enable security function activation when the mobile device is stored in any compatible holder. A mobile device may be configured for storage in a carrying holder such as shown in FIGS. 2 and 3, and for connection to a computer system through a cradle incorporating a serial port. In this case, the mobile device may include a magnet detection system for detecting when the mobile device has been stored in the holder, and a processor in the mobile device may detect activity on a serial port in the mobile device to thereby detect that the mobile device has been stored in the cradle.

In a similar manner, a proximity detector in a mobile device may detect when the mobile device has been stored in any of a plurality of mobile device holders. Where each holder incorporates a magnet, for example, a single magnet detection system detects when the mobile device has been stored in any one of the holders.

Where multiple holders are provided, the mobile device or proximity detector may be further configured to distinguish between the multiple holders and to activate particular security functions depending upon in which holder the mobile device has been stored. In such an arrangement, per-holder security function activation configurations could be specified, to thereby provide multiple security or protection levels. A mobile device user may wish to activate all security functions when the mobile device is stored in a carrying holder, but only a limited set of security functions when the mobile device is connected to a workplace computer system via a mobile device cradle, particularly where the workplace is physically secure and it is less likely that an unauthorized party may have access to the mobile device. Holder differentiation may be enabled for example, by using different types of proximity detectors for each holder, or a proximity detector configured to determine a holder type, such as a barcode scanner, for example.

Implementation of security function activation preferably does not preclude other security measures. Although certain security functions may be activated when a mobile device is stored in a holder, the same or similar security functions can preferably also be activated manually, or by other conventional means, such as timers. Security function activation as described herein may therefore be implemented in addition to existing security measures on a mobile device.

What is claimed is:

1. A mobile device comprising:
    a display;
    a proximity detector capable of detecting a magnet;
    a user interface capable of receiving user input; and
    a processor having a security function capable of locking the device after the magnet retained by a mobile device cover configured to cover at least a portion of the display of the mobile device is detected by the proximity detector and capable of unlocking the device in response to receiving a correct user input,
    wherein when locked, the mobile device is configured to restrict access to one or more resources of the mobile device.

2. The mobile device of claim 1 wherein the security function is capable of closing a data item after the magnet is detected by the proximity detector.

3. The mobile device of claim 1 wherein the resources comprise stored information.

4. The mobile device of claim 1 wherein the resources comprise mobile device functions.

5. The mobile device of claim 1 wherein the resources comprise one or more services provided by the mobile device.

6. The mobile device of claim 1 wherein the mobile device is capable of deleting information stored on the mobile device after the magnet is detected by the proximity detector.

7. The mobile device of claim 1 wherein the mobile device is capable of shutting off the display of the mobile device after the magnet is detected by the proximity detector.

8. The mobile device of claim 1 wherein the proximity detector comprises a Hall effect sensor.

9. The mobile device of claim 1 wherein the correct user input comprises a password or pass phrase.

10. The mobile device of claim 1 wherein the correct user input is chosen by a user.

11. A method comprising:
    covering with a mobile device cover at least a portion of a display of a mobile device;
    locking the mobile device after a proximity detector detects a magnet;
    unlocking the mobile device in response to receiving a correct user input via a user interface; and
    restricting access to one or more resources of the mobile device when the mobile device is locked.

12. The method of claim 11 further comprising closing a data item after the magnet is detected by the proximity detector.

13. The method of claim 11 wherein the resources comprise stored information.

14. The method of claim 11 wherein the resources comprise mobile device functions.

15. The method of claim 11 wherein the resources comprise one or more services provided by the mobile device.

16. The method of claim 11 further comprising deleting information stored on the mobile device after the magnet is detected by the proximity detector.

17. The method of claim 11 further comprising shutting off the display of the mobile device after the magnet is detected by the proximity detector.

18. The method of claim 11 wherein the proximity detector comprises a Hall effect sensor.

19. The method of claim 11 wherein the correct user input comprises a password or pass phrase.

20. The method of claim 11 wherein the correct user input is chosen by a user.

21. A non-transitory machine-readable medium comprising instructions that when executed by a processor perform operations comprising:
    locking a mobile device after a proximity detector detects a magnet of a mobile device cover that covers at least a portion of a display of the mobile device;
    unlocking the mobile device in response to receiving a correct user input via a user interface; and
    restricting access to one or more resources of the mobile device when the mobile device is locked.

22. The non-transitory machine-readable medium of claim 21 wherein the operations further comprise closing a data item after the magnet is detected by the proximity detector.

23. The non-transitory machine-readable medium of claim 21 wherein the resources comprise stored information.

24. The non-transitory machine-readable medium of claim 21 wherein the resources comprise mobile device functions.

25. The non-transitory machine-readable medium of claim 21 wherein the resources comprise one or more services provided by the mobile device.

26. The non-transitory machine-readable medium of claim 21 wherein the operations further comprise deleting information stored on the mobile device after the magnet is detected by the proximity detector.

27. The non-transitory machine-readable medium of claim 21 wherein the operations further comprise shutting off the display of the mobile device after the magnet is detected by the proximity detector.

28. The non-transitory machine-readable medium of claim 21 wherein the proximity detector comprises a Hall effect sensor.

29. The non-transitory machine-readable medium of claim 21 wherein the correct user input comprises a password or pass phrase.

30. The non-transitory machine-readable medium of claim 21 wherein the correct user input is chosen by a user.

* * * * *